United States Patent [19]

Sharp

[11] 4,039,264
[45] Aug. 2, 1977

[54] SCAFFOLDING

[75] Inventor: Frederick George Sharp, West Bromwich, England

[73] Assignee: C. Bryant & Son Limited, West Midlands, England

[21] Appl. No.: 679,928

[22] Filed: Apr. 26, 1976

[30] Foreign Application Priority Data

Apr. 26, 1975  United Kingdom ............... 17403/75
July 22, 1975  United Kingdom ............... 30536/75

[51] Int. Cl.² ............................................. F16B 2/18
[52] U.S. Cl. ................................. 403/246; 403/49; 211/182; 182/179
[58] Field of Search ............... 403/49, 245, 246, 230, 403/190, 189, 256; 211/182; 182/179

[56] References Cited

U.S. PATENT DOCUMENTS

| 3,179,212 | 4/1965 | Gostling | 403/49 X |
| 3,273,921 | 9/1966 | Young et al. | 403/49 |
| 3,420,557 | 1/1969 | Francis et al. | 182/179 |
| 3,817,641 | 6/1974 | Steele | 182/179 X |

FOREIGN PATENT DOCUMENTS 1,185,169  3/1970  United Kingdom ............... 182/179

Primary Examiner—Andrew V. Kundrat
Attorney, Agent, or Firm—Scrivener, Parker, Scrivener and Clarke

[57] ABSTRACT

In scaffolding a cross member is connected to an upright member by means of a dependent spigot which engages in a socket on the upright, and is secured to the upright by jamming the spigot in the socket by means of a retaining member carried by the cross member which is movable relative to the spigot by rotation of an associated cam.

20 Claims, 8 Drawing Figures

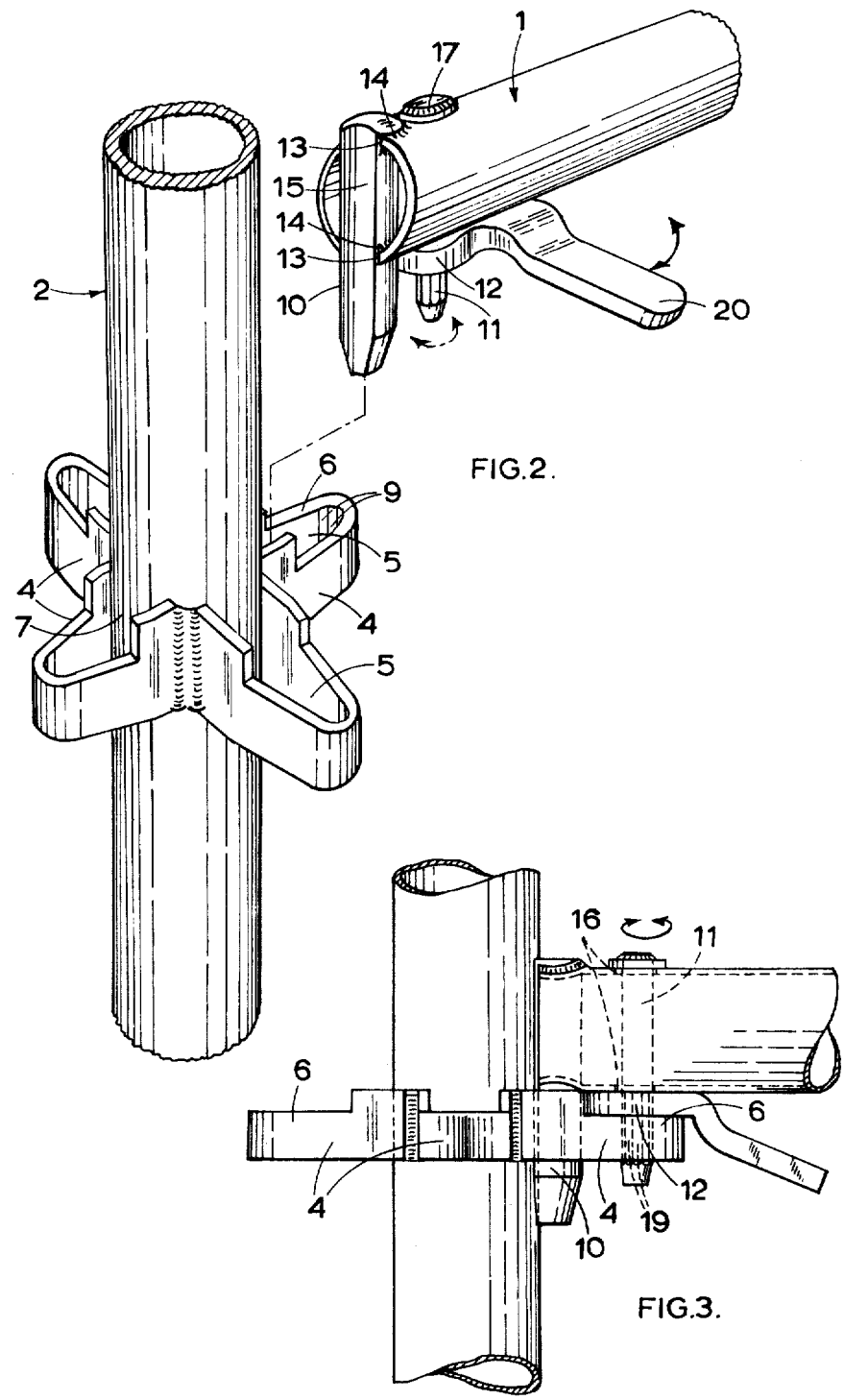

SCAFFOLDING

This invention relates to scaffolding of the kind in which cross members, such as horizontal ledger members, transom members, putlogs or handrails, or shelf or platform supports, or diagonal bracing members, are separably connected to uprights. Such scaffolding is hereinafter referred to as "of the kind described".

An object of the present invention is to provide scaffolding of the kind described which includes an upright member having a socket, and a cross member having a dependent spigot adapted to be inserted in the socket, a cam mounted for rotation relative to the cross member and a retaining member which is adapted in use when the spigot is received in the socket, to be moved relative to the spigot by rotation of the cam to jam the spigot in the socket and thereby secure the cross member to the upright member. The retaining member may be received in the socket or extend outside and engage with an external surface thereof.

A further object of the invention is to provide scaffolding of the kind described which includes an upright member having a socket, and a cross member having a dependent spigot adapted to be inserted in the socket, a retaining member which is also adapted to be inserted in the socket and a cam mounted for rotation relative to the cross member and being adapted in use when the spigot and retaining member are received in the socket, to apply tensil loading between the spigot and the retaining member which jams the spigot and retaining member in the socket thereby to secure the cross member to the upright member.

The cam may be carried by the retaining member. Alternatively the cam may be separate from the retaining member and be arranged to co-operate with it. Where the cam is carried by the retaining member and the retaining member is adapted to be engaged in the socket, the cam may bear on the spigot to cause the tensile loading to be applied between the member and the spigot.

The cam may be an eccentric. Preferably the cam is an eccentrically mounted disc. In either case it may have a projecting arm for rotating it.

The retaining member may be in the form of a peg which depends from the cross member and is supported in an elongated hole or holes which permit the member to move in a direction generally transverse to the spigot. It may also be rotatable relative to the cross member or it may be non-rotatable. In a preferred form in which the retaining member carries the cam, the retaining member is a headed peg supported on the cross member and having a portion which depends from the cross member, the head of the peg and the cam being at opposite sides of the support for the peg so as to locate, and preferably secure, the peg relative to the cross member, particularly in the lengthwise direction of the peg.

It is possible for the spigot, retaining member and cam to be mounted directly on the cross member itself. Alternatively they may be mounted on an end-piece which is fitted to the cross member. Particularly, though not only, when the cross member is a diagonal bracing member, it may be convenient for it to be provided with an end-piece. In this specification, the term "cross member" is deemed also to include such an end-piece.

The spigot is preferably formed from a length of metal rod which is let into a complementary hole or holes in the part of the cross member at which it is supported and is welded to the support part adjacent to the hole or holes. The two-fold location of the rod provided by its engagement in the hole or holes and by the weld connects it very securely to the support part.

The spigot may have a vertically extending hollowed surface with opposite vertical side edges adapted to engage with a bearing surface in the socket, and preferably to bite into the bearing surface when the cam is operated to jam the spigot in the socket.

In the preferred form in which the retaining member carries the cam, the member conveniently is rotatable with the cam and has a plurality of parallel flat surfaces angularly disposed about the rotational axis, and complementary flat surfaces are provided in the socket with which the flat surfaces of the retaining member engage. This produces a notch action as the retaining member is rotated and provides substantial restraint to unintentional turning of the member, and hence of the cam, when the retaining member and spigot are jammed in the socket.

The socket on the upright may be provided in any suitable manner. It may, for example, be in a bracket which is permanently fixed to the upright or which may be releasably attached to the upright. The bracket may be V-shaped with the wide end of the Vee next to and closed by part of the surface of the upright, which thus forms one wall of the socket. Such a bracket is suitable when the spigot and retaining member are both received into the socket. The spigot preferably abuts against the said part of the surface of the upright, and the retaining member engages in the narrow part of the socket at the angle of the Vee. As the cam is rotated to apply the tensile loading between the spigot and the retaining member the latter is urged tightly against the converging limbs of the bracket and the spigot is urged tightly against the upright.

As in known scaffolding systems, the socket may comprise one of a set of sockets of which a plurality are disposed at spaced apart positions along the length of an upright. Each set preferably comprises four sockets disposed at equal angles apart about the central longitudinal axis of the upright and all disposed at the same level on the upright.

Furthermore, the cross member may have a spigot at only one end, or at both ends depending on the intended use of the cross member. The main length of the cross member may be of any suitable configuration and material, e.g. of conventional circular section scaffold tube or right-angle rolled steel section. Pairs of cross members may be connected together to form frames.

An embodiment of the invention will now be described by way of example with reference to the accompanying drawings in which:

FIG. 2 is an enlarged fragmentary perspective view of an upright member and a cross member of the scaffolding, the members being separated;

FIG. 3 is a fragmentary side view of the upright and cross members connected together;

Figure 1:
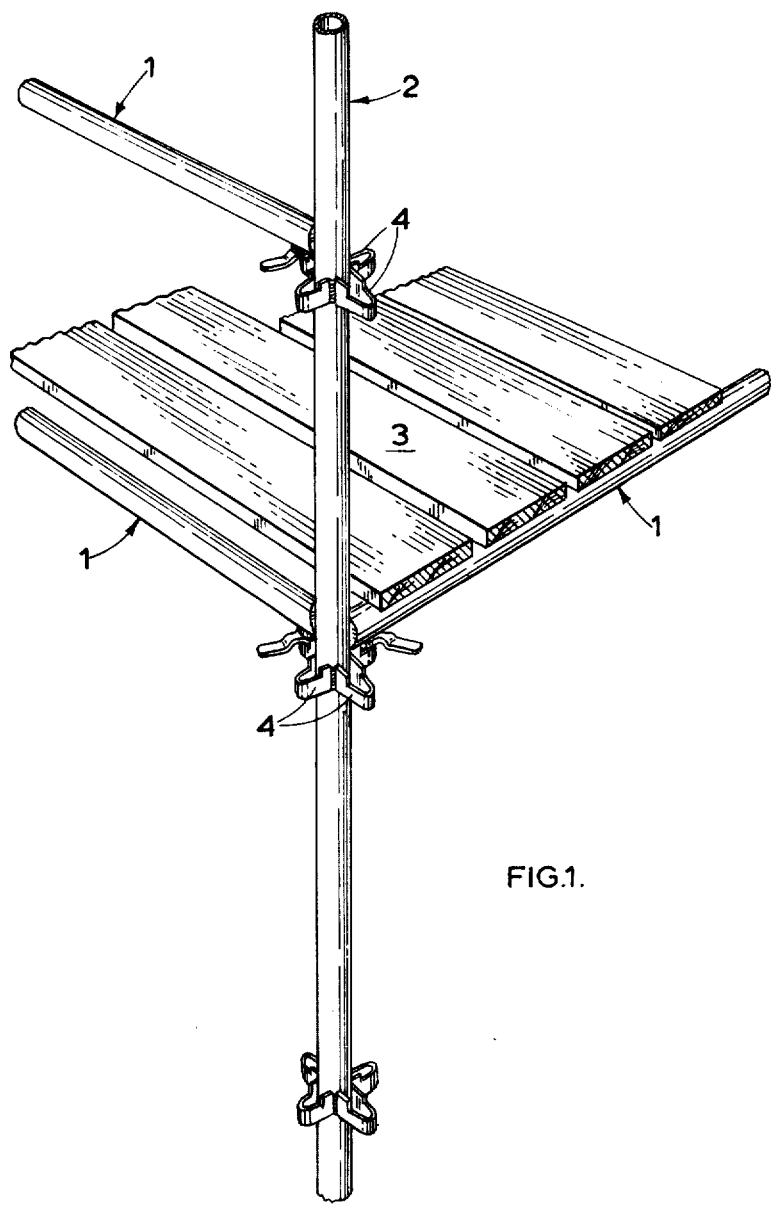
FIG. 1 is a perspective view of part of scaffolding in accordance with the invention.
Figure 4:
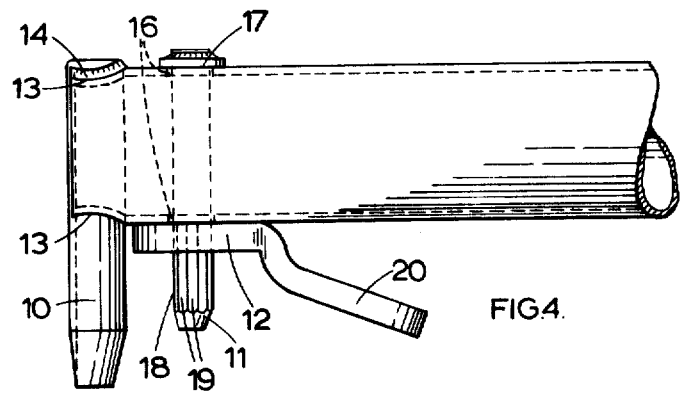
FIGS. 4 and 5 are side and inverted plan views respectively of the cross member.
Figure 5:
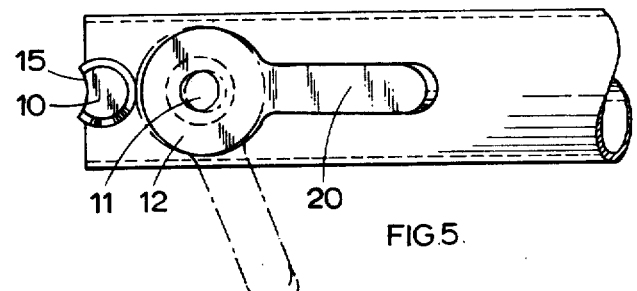

Referring to FIG. 1 of the drawings, horizontal cross members 1 of a scaffolding are connected to an upright member 2. The cross members shown are a transom member which helps to support a working platform 3, a ledger member at the same level as the transom member and a handrail spaced above the ledger member.

Figure 6:
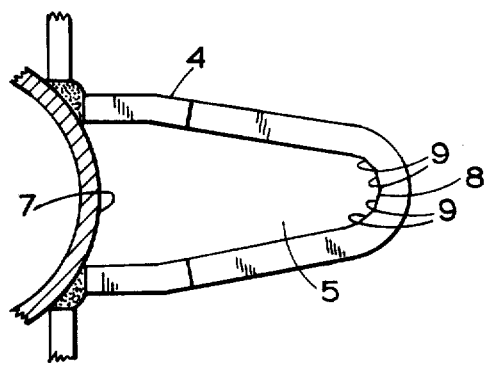
FIG. 6 is an enlarged plan view of a socket of the upright member.

The upright member 2 is made of scaffold tube and has sets of socket elements 4 at spaced positions along its length. Each set consists of four socket elements which project laterally from the member at right angles to one another and all at the same level. Each socket element 4, as best seen in FIGS. 2, 3 and 6, is formed from a strip of metal plate bent to substantially V-shape with a rounded closed end and welded to the upright member at the ends of its flanges to define a socket 5 which is open at the top and bottom. The socket element has a cut-away top edge portion 6. The portion of the wall of the upright member between the flanges forms a first bearing surface 7 in the socket 5. A second bearing surface 8 is formed by the internal surface of the closed end of the socket element 4. This second bearing surface 8 has a series of mutually inclined, vertically-extending flat faces 9.

The cross members 1 are also made from scaffolding tube. At the end by which it is connected to the upright member 2, each cross member has, as can be seen in FIGS. 2 to 5, a depending spigot 10 fixed to the end, a depending retaining member in the form of a peg 11 rotatably mounted on the cross member inboard of and parallel to the spigot, and a circular cam 12 eccentrically mounted rigidly on the peg 11 immediately below the cross member. The spigot 10 and peg 11 engage in one of the sockets 5 respectively next to the first and second bearing surfaces 7 and 8.

Diametrically opposed holes 13 in the wall of the cross member 1 locate the spigot 10 and welding 14 adjacent to the holes rigidly retains the spigot to the cross member. The spigot is made from a length of round section bar which is tapered at its lower end and hollowed out along one side to present a concave, vertically extending abutment surface 15 remote from the peg 11. The radius of curvature of the abutment surface 15 is a little less than that of the external surface of the upright member 2.

The peg 11 is located in vertically aligned oval holes 16 in the cross member the minimum diameters of which are complementary to the diameter of the peg and the maximum diameters, which extend longitudinally of the cross member, are slightly larger than the diameter of the peg, thereby allowing the peg to move laterally relative to the spigot 10. The holes 16 are so positioned with respect to the spigot that when the peg is at the ends (the near ends) of the holes nearest to the spigot the distance from the abutment surface 15 to the remote side of the peg is less than the distance between the first and second bearing surfaces 7 and 8, and when the peg is at the opposite ends (the far ends) of the holes the first-mentioned distance is fractionally greater than the distance between the first and second bearing surfaces. Vertical movement of the peg relative to the cross member is prevented by a head 17 of the peg above the cross member and by the cam 12 below the member. A portion 18 of the peg extends below the cam. It is tapered at its lower end and has a dodecagonal cross-section which presents a series of vertically extending flats 19 around the surface of the peg. The flat faces 9 of the second bearing surface 8 in the socket 4 are complementary to, and inclined to one another at corresponding angles to, the flats 19 of the peg.

The cam 12 has an eccentric aperture in which the peg is engaged with a tight interference fit which retains the cam rigidly on the peg. It has an outwardly and downwardly projecting arm 20 for rotating it. The least projection of the cam from the peg is less than the distance from the spigot 10 to the near ends of the oval holes 16 in the cross member. Its greatest projection is larger than the distance from the spigot to the near side of the peg when the peg is adjacent to the far ends of the oval holes. Thus, when the cam 12 is in a released angular position in which the least projection is towards the spigot the peg can occupy a position at the near ends of the oval holes 16, and when the cam is turned to move the greater projection towards the spigot it bears on the spigot and causes the peg to be urged away from the spigot.

For fitting the cross member to the upright member the cam is set in its released position, and the spigot 10 and peg 11 are inserted in the socket 5 respectively against the first and second bearing surfaces 7 and 8. The cam rests on the cut-away top edge portion 6 of the socket element 4. Subsequently the cam is rotated to move its greater projection into bearing contact with the spigot. This urges the peg away from the spigot and forces the abutment surface 15 of the spigot and the peg portion 18 tightly against the bearing surfaces, thereby jamming the spigot and peg in the socket and clamping the cross member firmly to the upright member. As the abutment surface 15 has a different curvature to the first bearing surface 7, its contact with the surface is confined to its side edges which bite into the surface. The interengagement between the flats 19 of the peg portion 18 and the flat faces 9 of the second bearing surface 8 prevents the cam from being released unintentionally. If necessary the arm 20 of the cam may be struck with a hammer to release the cam, or, for example, a length of tube may be engaged with the arm to enable additional leverage to be applied to release the cam.

The ledger and handrail cross members each have a spigot, peg and cam at both ends. The transom cross member may also have them at both ends, or just at the one end, the other end of the member being spade-shaped or otherwise formed as desired.

Figure 7:
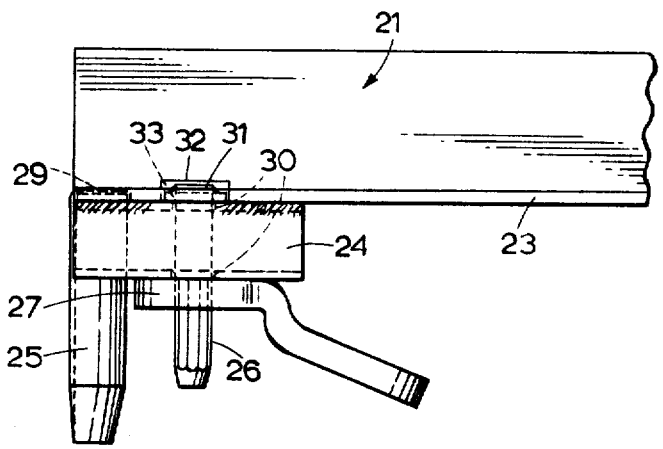
FIGS. 7 and 8 are side and end views respectively of another form of cross member.
Figure 8:
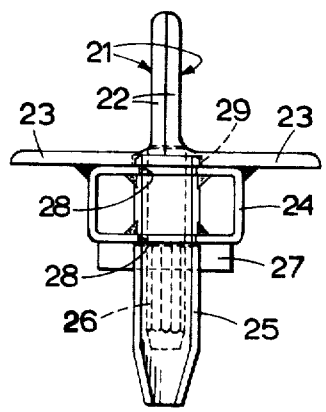

Referring now to FIGS. 7 and 8 of the drawings, the cross member is a transom member. The member is formed from two lengths of angle-section 21 which are welded together back-to-back at upstanding flanges 22 thereof, their horizontal flanges 23 being co-planar and directed away from one another. At each end of the cross member there is a housing 24 which is formed from oblong rectangular section tube welded at one of its wider side walls centrally to the undersides of the horizontal flanges 22 of the angle-sections 21, the central longitudinal axis of the tube extending lengthwise of the cross member.

Each housing 24 has a depending spigot 25, a depending peg 26 and eccentric cam 27 of similar form to the spigot, peg and cam of the first-described embodiment and similarly arranged in relation to one another. The spigot 25 is let into vertically aligned holes 28 in opposite sides of the housing and welded to the housing around the holes. The upper end of the spigot projects just above the housing and a recess 29 is formed in the undersides of the horizontal flanges 23 to accommodate it. The peg 26 is located in vertically aligned oval holes 30 in the housing dimensioned and positioned as in the previous embodiments to permit limited lateral movement of the peg relative to the spigot. A head 31 of the peg 26 is accommodated in a further recess 32 in the horizontal flanges 23 of the cross member, which also extends into the upstanding flanges 22 to some extent. The recess 32 is large enough to receive not only the head but also a washer 33 which is fitted to the peg immediately below the head and rests on the housing, and the recess permits the desired lateral movement of the peg.

In all other respects the spigot, peg and cam are the same as their counterparts in the first-described embodiment, as can be seen, and serve to clamp the cross member of an upright member in the same manner, the spigot and peg engaging in a socket of the form described.

For a cross member which is a diagonal bracing member a spigot, peg and cam may be provided on an end-piece which forms part of the cross member. The end-piece may have a short tubular body part, to which the spigot and peg may be attached in similar manner to those of the illustrated embodiments, and a reduced section locating portion at one end of the body part which is inserted into a complementary hole in one end portion of the main body of the cross member and secured. If the main body is made of tube the hole may be in a flattened end-portion of the tube. The locating portion may be rolled over and/or welded to secure it to the end portion.

I claim:

1. Scaffolding including an upright member having a socket, and a cross member having a dependent spigot adapted to be inserted in said socket, a cam mounted for rotation relative to said cross member and a retaining member which is acted upon by said cam and is movable relative to said spigot by rotation of said cam to jam said spigot in said socket and thereby secure said cross member to said upright member.

2. Scaffolding according to claim 1 wherein said retaining member is adapted to be received in said socket.

3. Scaffolding including an upright member having a socket, and a cross member having a dependent spigot adapted to be inserted in said socket, a retaining member which is also adapted to be inserted in said socket and is movable relative to said spigot, and a cam mounted for rotation relative to said cross member which said cam acts between said retaining member and said spigot to cause said retaining member to move relative to said spigot and by means of which, when said spigot and retaining member are both received in said socket, tensile loading can be applied between said spigot and said retaining member which jams said spigot and retaining member in said socket, thereby to secure said cross member to said upright member.

4. Scaffolding according to claim 3 wherein said cam is carried by said retaining member.

5. Scaffolding according to claim 4 wherein said cam is adapted to bear on said spigot to cause said retaining member to move relative to said spigot and apply said tensile loading between said retaining member and said spigot.

6. Scaffolding according to claim 3 wherein said cross member has a support-part having elongated holes in which said retaining member is supported parallel to said spigot and which permit said retaining member to move in a direction generally transverse to said spigot.

7. Scaffolding according to claim 3 wherein said retaining member is rotatable relative to said cross member.

8. Scaffolding according to claim 5 wherein said retaining member is rotatable with said cam relative to said cross member and has a plurality of parallel flat surfaces angularly disposed about the rotational axis, and complementary flat surfaces are provided in said socket with which said flat surfaces of said retaining member engage thereby to restrain said retaining member from unintentional rotation.

9. Scaffolding according to claim 8 wherein said retaining member has a portion of dodecagonal cross-section which provides said flat surfaces of said member.

10. Scaffolding according to claim 4 wherein said cross member has a support-part for said retaining member, and said retaining member comprises a peg having a head and a portion which depends from said support part, said head and said cam carried by said retaining member being at opposite sides of said support-part and thereby locating said peg relative to support-part.

11. Scaffolding according to claim 3 wherein said cam is an eccentric.

12. Scaffolding according to claim 3 wherein said cam is an eccentrically mounted disc.

13. Scaffolding according to claim 3 wherein said cam has a projecting arm for rotating it.

14. Scaffolding according to claim 3 wherein said cross-member has a support-part for said spigot formed with holes, and said spigot comprises a length of metal rod which is let into said holes and is welded to said support part adjacent to said holes.

15. Scaffolding according to claim 3 wherein said socket has a bearing surface and said spigot has a vertically extending hollowed surface which has opposite vertical side edges adapted to engage with said bearing surface.

16. Scaffolding according to claim 3 wherein said socket is in a bracket permanently fixed to said upright member.

17. Scaffolding according to claim 3 wherein said socket is in a bracket on said upright member of V-shape having a wide end next to and closed by part of the surface of said upright member, which said surface part of said upright member forms a wall of said socket.

18. Scaffolding according to claim 17 wherein said spigot abuts against said surface part of said upright member in said socket and said retaining member engages in the angle of the V-shape of said bracket, rotation of said cam to apply said tensile loading between said spigot and said retaining member causing said retaining member to be urged against said angle and said spigot to be urged against said surface part of said upright member.

19. Scaffolding according to claim 3 wherein said socket is in a bracket on said upright member which has a cut-away top edge portion on which said cam rests when said spigot and retaining member are received in said socket.

20. Scaffolding according to claim 3 wherein said socket comprises one of a set of sockets.

* * * * *